United States Patent [19]
Sakler et al.

[11] 3,935,321
[45] Jan. 27, 1976

[54] ACCELERATED COOLING METHOD

[75] Inventors: Stephen Allen Sakler, Bronx, N.Y.; Samuel Joseph Porcello, Wayne; Jack L. Rossen, Englewood, both of N.J.

[73] Assignee: Nabisco, Inc., East Hanover, N.J.

[22] Filed: Jan. 11, 1974

[21] Appl. No.: 432,743

[52] U.S. Cl. .................. 426/244; 426/524; 62/62
[51] Int. Cl.² ........................................ A23D 6/00
[58] Field of Search .......... 426/235, 236, 237, 244, 426/245, 247, 524; 219/10.65, 10.81; 62/264, 62, 66

[56] References Cited
UNITED STATES PATENTS
2,829,977  4/1958  Jamin ................................ 426/247
3,108,874  10/1963  Baldwin ............................ 426/240

*Primary Examiner*—Wilbur L. Bascomb, Jr.
*Assistant Examiner*—Martin G. Mullen
*Attorney, Agent, or Firm*—Gerald Durstewitz; I. Allen Strombeck

[57] ABSTRACT

Products having at least an outer layer of a hot semi-liquid material which crystallizes and hardens upon cooling are placed on a conveyor and transported through a cooling tunnel. Within the cooling tunnel, the product is initially subjected to a high voltage field producing a corona current to accelerate initial cooling. The product is moved out of the field while the surface is still semi-liquid and subjected only to the cool air environment of the tunnel while the surface crystallizes and hardens. The product is then moved into a second high voltage field producing a corona current to remove heat from the inner regions of the material to inhibit remelting of the surface after the product exits the cooling tunnel.

6 Claims, 3 Drawing Figures

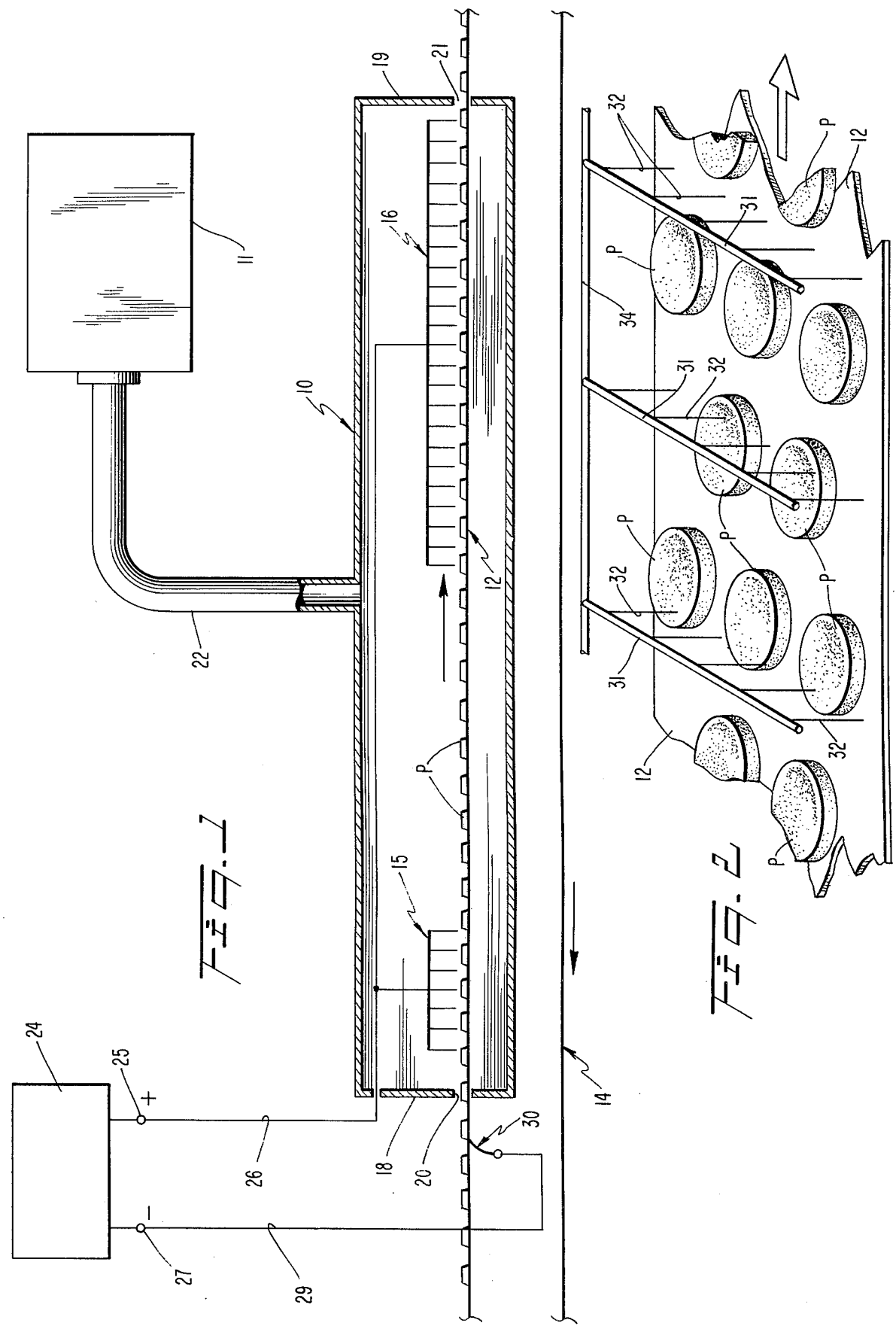

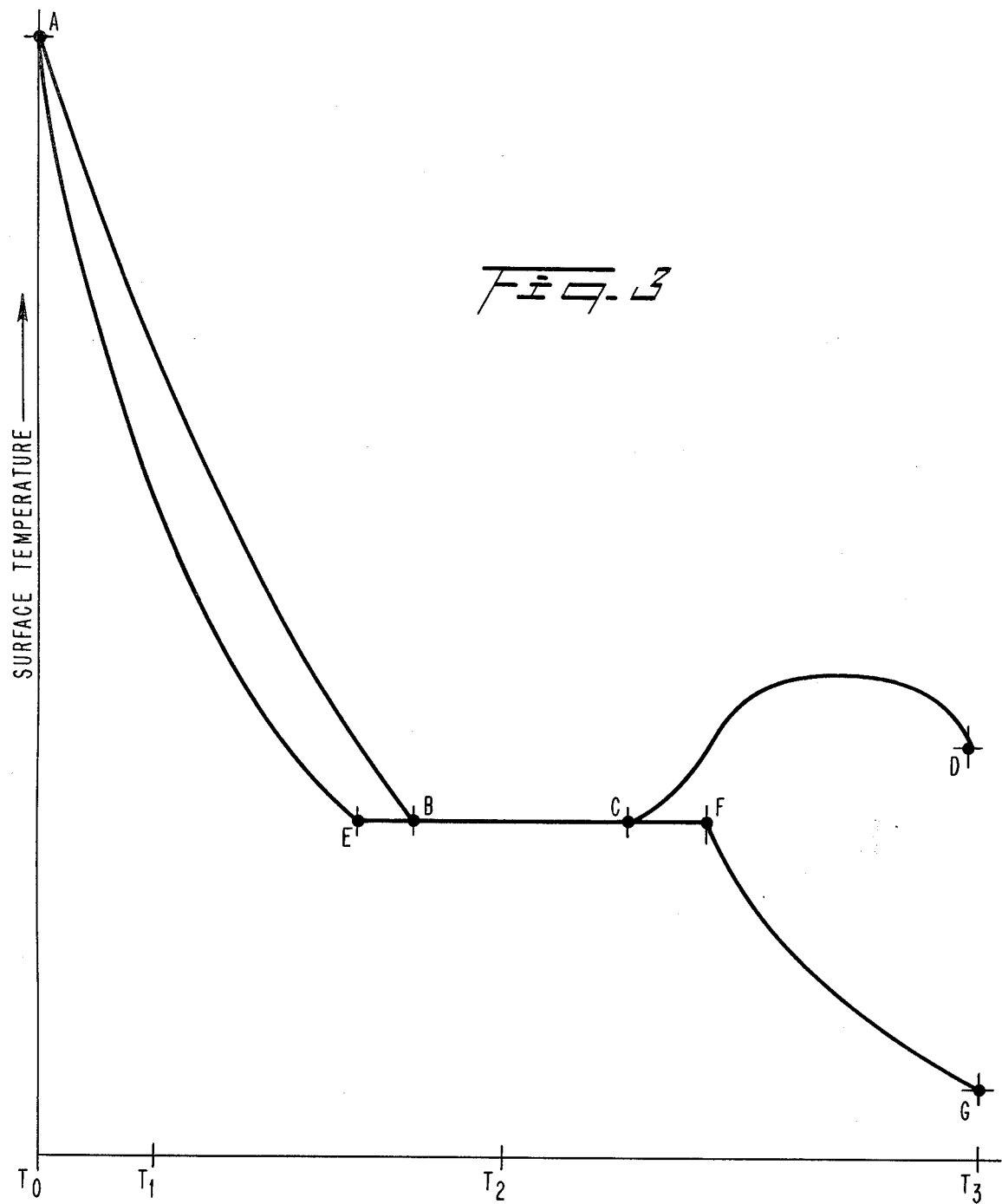

ACCELERATED COOLING METHOD

BACKGROUND OF THE INVENTION

The present invention relates to the production of food products, and, more particularly, to the production of products having at least an outer layer of a material which is heat liquified in the formation of the product and which crystallizes upon cooling to provide a glossy surface.

In the manufacturing of products which are formed of, or coated with, a material which crystallize upon cooling, great care must be exercised to properly cool the products so that the structure of the surface layer is composed of small crystals which provide the desired high quality surface gloss. The materials which require such careful treatment include chocolate, compounds which are a blend of cocoa, sugar and a hard butter, and icings. A consistently high quality smooth glossy surface can be achieved by allowing the products too cool at room temperature until the surface has solidified. Under these conditions, the crystallizing material cools slowly and evenly so that crystal formation begins simultaneously over the entire surface. The growth of each crystal is thus limited by the presence of surrounding crystals and the entire surface develops a structure of small crystals. The slow cooling allows most of the heat within the interior of the material to escape before the surface crystallizes so that the heat remaining after this crystallization is insufficient to remelt and thereby alter the surface structure.

Room temperature cooling, however, requires a long time period during which the product cannot be handled and therefore is economically impractical. It has been standard practice therefore to use a cooling tunnel to rapidly cool the product sufficiently to cause the surface to harden to an extent which permits the products to be packaged. The temperature in the cooling tunnel is typically about 40° F at the central portion thereof and about 60° to 70° F at the entrance end so that the products are not subjected to rapid temperature changes during crystal formation. The products are carried through the cooling tunnel on a conveyor and are within the tunnel for a short period of time, for example 6 to 9 minutes.

The degree to which products can be cooled in a conventional cooling tunnel during a specified period of time is limited. If the temperature within the tunnel is decreased substantially, large crystals form, producing a dull finish. Also, the material hardens too much, decreasing its ability to conduct heat so that the flow of heat from the interior regions of the product is retarded. The surface material, therefore, may crack as a result of the stressess produced by the temperature differential between the surface and the interior regions. Also, if the surface of the product, when it leaves the tunnel, is at a temperature below the dew point of the air in the packaging area, moisture will condense on the coating and mar the surface gloss.

In materials containing crystallizing fats or butters, the packaged products must be stored in a mildly cool environment (for example at 60°F) for an extended period of time (for example 24 hours) to remove the heat from the interior regions of the material gradually. The heat must be removed at a rate which is sufficient to inhibit remelting of the surface but will not unduly harden the surface before the heat is removed so as to trap the heat within the product. With fat containing materials, the entire cooling process must be conducted with particular care to obtain a high quality surface. If there is insufficient cooling of the product interior in the cooling tunnel, or if the packaged product is not promptly placed in cool storage, the internal heat will remelt portions of the surface. Likewise, if the temperature within the tunnel is too low, excessive hardening of the outer layer traps heat within the product causing subsequent melting of the surface.

Remelting of the crystallized surface allows the fat to form larger globules which, upon subsequent cooling, form large fat crystals to product the whitish discoloration of fat bloom.

The present invention utilizes a corona current or electric wind (as it is sometimes called) in such a manner that a high gloss surface is produced and retained on crystalline surface products. In the past, it has been suggested that corona current can be used to cool metal in machining operations (U.S. Pat. No. 3,670,606), to accelerate the baking of bread (Canadian Pat. No. 783,385), and to cool hot loaves of bread (Chemistry and Industry, Oct. 23, 1971, p 1225). However the use of corona current as suggested by these disclosures results in a rough and dull surface when applied to a crystallizing material of the type under discussion.

SUMMARY OF THE INVENTION

It is an object of the present invention to provide an improved method of cooling food products having a surface which crystallizes upon cooling so as to provide a glossy surface texture.

Another object is to provide such a method which rapidly and uniformly cools the product to produce and retain a high quality glossy surface.

Another object is to provide such a method which eliminates the need for extended cool storage of products after packaging.

Another object is to provide such a method which increases the rate of production.

The foregoing objects are accommplished accomplished moving products having at the surface thereof a heat liquified edible material into a cooling atmosphere and subjecting the product to a corona current after the surface of the product has hardened to rapidly extract heat from the inner regions of the material.

BRIEF DESCRIPTION OF THE DRAWINGS

A preferred embodiment of the invention has been chosen for purposes of illustration and description, and is shown in the accompanying drawing, forming a part of the specification, wherein:

FIG. 1 is a schematic longitudinal sectional view of an apparatus for carrying out the accelerated cooling method of the present invention.

FIG. 2 is an isometric view of a portion of the apparatus shown in FIG. 1.

FIG. 3 is a graph showing the respective relationships of coating temperature to cooling time for the conventional prior art cooling method and for the accelerated cooling method of the present invention.

DETAILED DESCRIPTION OF THE INVENTION

Referring to the drawings in detail there is shown in FIG. 1 apparatus for carrying out the method of the present invention which comprises a cooling tunnel 10, a source of refrigerated air 11, a wire mesh conveyor belt for transporting products P through the tunnel having an upper flight 12 and a lower flight 14, and equipment for generating electrostatic fields within the cooling tunnel including two electrode sets 15 and 16 positioned above the upper conveyor flight 12.

The cooling tunnel 10 is essentially a closed insulated box having end walls 18 and 19 which are provided with horizontally extending slots 20 and 21 through which the upper conveyor flight 12 passes. Cold air from the refrigerating unit 11 is blown into the tunnel through a conduit 22 displacing air within the tunnel which flows out through the slots 20 and 21.

The products P may be composed wholly of the crystallizing material, for example chocolate, or they may be of composite construction having an outer coating of crystallizing material enrobing an edible center of a different nature. In the enrobed product, the center may be a base cake of baked dough, and the coating may be chocolate, a cocoa based compound, an icing, or like material.

The equipment for generating electrostatic fields includes a high voltage direct current source 24 having one terminal 25 connected to the electrode sets 15 and 16 through a cable 26 and having its other terminal 27 connected to the wire mesh conveyor belt through a cable 29 and a contact brush 30 engaging the lower surface of the upper flight 12.

The electrode sets 15 and 16 each includes, as shown in FIG. 2, a series of parallel horizontal metal rod conductors 31 positioned above and extending across the upper conveyor flight 12. A plurality of regularly spaced probes 32 extend vertically downwardly from each of the rods 31 toward the surface of the conveyor. The rods 31 in each probe set extend from a metal rod conductor 34 which is parallel to the conveyor and is supported by suitable insulators (not shown).

The electrode set 15 is positioned adjacent the end wall 18 of the tunnel 10 through which the hot products enter the tunnel.

This electrode set extends along the length of the conveyor for a relatively short distance. The electrode set 16 extends along the length of the conveyor for a longer distance and is positioned adjacent to the wall 19 of the tunnel through which the product pieces leave the tunnel.

The conveyor is driven at a constant speed therefore the length of the electrode sets and the spacing between the sets determine the time intervals during which the product pieces are exposed to electrostatic fields and the interval between such exposures.

The high voltage source 24 is adjusted to impress a high voltage of between 5,000 and 50,000 volts between the upper flight 12 of the conveyor and the probes 32. The voltage selected is that which will produce a maximum corona current flow between the probes and the conveyor when the product is interposed therebetween. The optimum voltage varies with the spacing of the probes from the conveyor and with the dielectric properties of the product pieces.

The corona current flow results from the ionization of air molecules adjacent the probes 32. The ions thus generated are repelled by the probe and attracted by the oppositely charged conveyor creating the corona current.

In accordance with the present invention, the products P enter the cooling tunnel on the conveyor through the opening 20 and pass beneath the electrode set 15 to initially expose the products to a corona current. The products are then exposed only to the cooling effect of the refrigerated air as they are carried between the electrode sets 15 and 16. As the products are carried under the electrode set 16, they are again exposed to corona current flow. The cooled products exit from the tunnel through the opening 21 and are carried to the packaging station.

The corona current flow produced by the electrode set 15 accelerates the cooling of the products to rapidly bring the surface temperature down toward the crystallizing temperature of the coating. The surface of the products is still semi-liquid when the products are carried out of the corona current flow generated at the electrode set 15.

The temperature of the cooling air, the speed of the conveyor and the spacing of the electrode sets 15 and 16 are such that the surface is cooled sufficiently to produce crystallization and hardening before the products enter the corona current flow generated by the electrode set 16.

The temperature within the portion of the cooling tunnel between the electrode sets is adjusted to a value of about 55°–65°F to produce a high quality surface having a small crystalline structure and a high gloss.

The products then pass through the corona current flow produced by the electrode set 16 to extract the latent heat within the interior regions of the crystallizing material so that the products exiting from the tunnel may be packaged and shipped without further cooling.

It has been found that a high quality surface can not be obtained if the product is subjected to corona current while the surface is solidifying. The application of corona current at this time produces a rough and dull surface apparently as a result of agitation of the surface molecules by the effect of the corona current.

In FIG. 3 the curve A B C D shows a typical variation of surface temperature with respect to time in a cooling environment for a compound coating enrobed baked product where the cooling is effected only by exposure of the product to air. The curve A E F G shows a typical variation of surface temperature with respect to time for an identical product where the cooling is effected by exposure to air (of the same temperature as in curve A B C D) and to corona current flow in accordance with the present invention. Comparison of the two curves shows the effect of corona current on the surface temperature.

In curve A B C D, from point A to point B heat is extracted from the surface of the coating by the ambient air at a rate faster than at which heat is supplied to the surface from the interior of the coating. From point B to point C, the surface is solidfying and remains at a constant temperature. The solidifed surface does not conduct heat as rapidly as it does in the liquid state, therefore, the latent heat in the interior regions of the coating is not released and the surface begins to melt and the temperature of the surface increases as shown between points C and D.

With reference to the curve A E F G, the product was subjected to corona current flow for the period of time $T_0$ to $T_1$. The product was then exposed only to air for the period $T_1$ to $T_2$ while the surface solidified. At time $T_2$ until $T_3$ the product was again subject to corona current flow.

It will be seen that the first application of corona current accelerated the initial cooling of the product (points A – E) and that the second appllication of corona current accelerated the cooling of the interior regions of the coating so that substantial crystallization of the entire coating was quickly achieved (E – F) after which the surface temperature continued to decrease (F – G).

The first application of corona current shortens the cooling time required to harden the surface, and the second application of corona current extracts the latent heat from the interior regions of the coating to prevent the softening or remelting of the surface. Obviously, the first application of corona current can be omitted where a slight extension in cooling time can be tolerated.

While a simple single stage cooling tunnel is shown to illustrate the present invention, it is to be understood the invention may be practiced with any cooling tunnel which can be modified to accept corona current generating apparatus. It is also to be understood that electrical equipment of different construction and arrangement may be used to generate the corona current utilized in the practice of this invention.

We claim:

1. The method of cooling an edible product having at least an outer layer of a hot fluid material which crystalizes upon cooling comprising the steps of exposing the product to a cooling atmosphere until the fluid material at the outer surface of the product has hardened, subjecting the product after the hardening of the surface thereof to a corona current to rapidly extract heat from the interior regions of the material without increasing the temperature of the hardened surface, the corona current flowing between oppositely polarized high voltage electrodes positioned on opposite sides of the product.

2. The method of claim 1 wherein the product continues to be exposed to the cooling atmosphere while it is subjected to the corona current.

3. The method of claim 2 wherein the product is transported from a zone of elevated temperature into a zone containing the cooling atmosphere and is continuously moved through a first portion of said zone wherein the surface is hardened and subsequently through a second portion of said zone wherein said corona current is applied to the product.

4. The method of claim 3 including the step of subjecting the product to a corona current for a period of time before the surface hardens sufficient to accelerate the cooling of said outer layer, said period ending before the surface begins to harden.

5. The method of claim 3 wherein said zone of cooling atmosphere is provided by a cooling tunnel.

6. The method of claim 5 wherein the coldest portion of said tunnel is between about 55° to 65°F.

* * * * *